(12) United States Patent
Smith

(10) Patent No.: US 9,154,225 B2
(45) Date of Patent: Oct. 6, 2015

(54) SPEED TEST THROUGHPUT DISTRIBUTION

(71) Applicant: Verizon Patent and Licensing Inc., Basking Ridge, NJ (US)

(72) Inventor: Donald E. Smith, Lexington, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 223 days.

(21) Appl. No.: 13/895,661

(22) Filed: May 16, 2013

(65) Prior Publication Data

US 2014/0341566 A1 Nov. 20, 2014

(51) Int. Cl.
*H04B 10/00* (2013.01)
*H04B 10/077* (2013.01)

(52) U.S. Cl.
CPC .................. *H04B 10/0775* (2013.01)

(58) Field of Classification Search
CPC ............................ H04B 10/07; H04B 10/0775
USPC ............................................. 370/236, 237
See application file for complete search history.

(56) References Cited

U.S. PATENT DOCUMENTS

| 2004/0100903 A1* | 5/2004 | Han et al. ............ 370/230 |
| 2009/0180430 A1* | 7/2009 | Fadell ................. 370/329 |
| 2011/0299400 A1* | 12/2011 | Cohen et al. ........ 370/237 |
| 2012/0243415 A1* | 9/2012 | Nishioka .......... 370/235.1 |

* cited by examiner

*Primary Examiner* — Danny Leung

(57) ABSTRACT

A method may include determining a total data demand distribution for a plurality of subscribers associated with a link between a gateway router (GWR) and an optical line terminal (OLT) in a network. The method also includes identifying a maximum link capacity of the link between the GWR and the OLT. The method further includes identifying a speed tier for which a speed test is to be executed, and determining a speed test throughput distribution based on the speed tier, the total data demand distribution and the maximum link capacity in an identified time interval.

20 Claims, 8 Drawing Sheets

SPEED TEST THROUGHPUT DISTRIBUTION

BACKGROUND INFORMATION

Telecommunications service providers and their customers monitor the speeds at which their customers can download data. These speeds are often a key part of advertising. The Federal Communications Commission (FCC) is similarly concerned with data speeds and has established a process to measure achievable data speeds for selected users. The process entails running a speed test on a customer's computer.

In the speed test, an agent on the customer's computer downloads a large file from a server for a predetermined time (e.g., a 20 second interval). During an interval after the connection has become stable (e.g., five seconds beginning from 10-15 seconds in the 20 second interval) the agent measures how many bytes arrived from the server and divides by the download time to get the download throughput in megabits per second (Mbps). The throughput should match the customer's provisioned data rate. For example, a customer provisioned at 25 Mbps should be able to run speed tests at 25 Mbps. In some instances, the speed test throughput will be less than the customer's provisioned data rate. This may be a result of congestion on a link that the customer shares with other traffic.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may determine a data demand distribution model of data demand traffic on a link (e.g., a gigabit Ethernet link) from a gateway router (GWR) in a service provider's network to a service provider's central office (e.g., an optical line terminator (OLT)). The data demand distribution model generates a probability distribution, which indicates a probability during a particular interval (e.g., a busy evening hour) that demand is at a given level. For example, the data demand probability distribution might indicate that demand exceeds 950 Mbps with a probability of 2%.

A speed test simulation model may indicate a speed test throughput when a speed test runs while the total data demand on the link is at a given level. The data demand probability distribution from the data demand distribution model may indicate a probability of each throughput. That is, the speed test simulation model yields the distribution of speed test throughputs on an OLT. The systems and methods may determine an average of the throughput distribution, which is the average speed test throughput during the identified time interval (e.g., the busy evening hour). This information may be used to approximate data measured and reported by the FCC.

Data services are nominally best effort services, meaning that the service provider does not guarantee that customers can always transmit/receive data at their provisioned rates. In other words, typical data services do not have Quality of Service (QoS) promises attached to them. However, the public's awareness of speed test results, particularly from FCC reports of its testing program, has elevated speed test performance to a de facto QoS metric. Good service means that the speed test performance is close to the customer's provisioned speed. Low speed test results can damage a service provider's reputation in the marketplace. The speed test simulation may allow a service provider to consistently achieve throughput that matches a customer's provisioned speeds.

Figure 1:
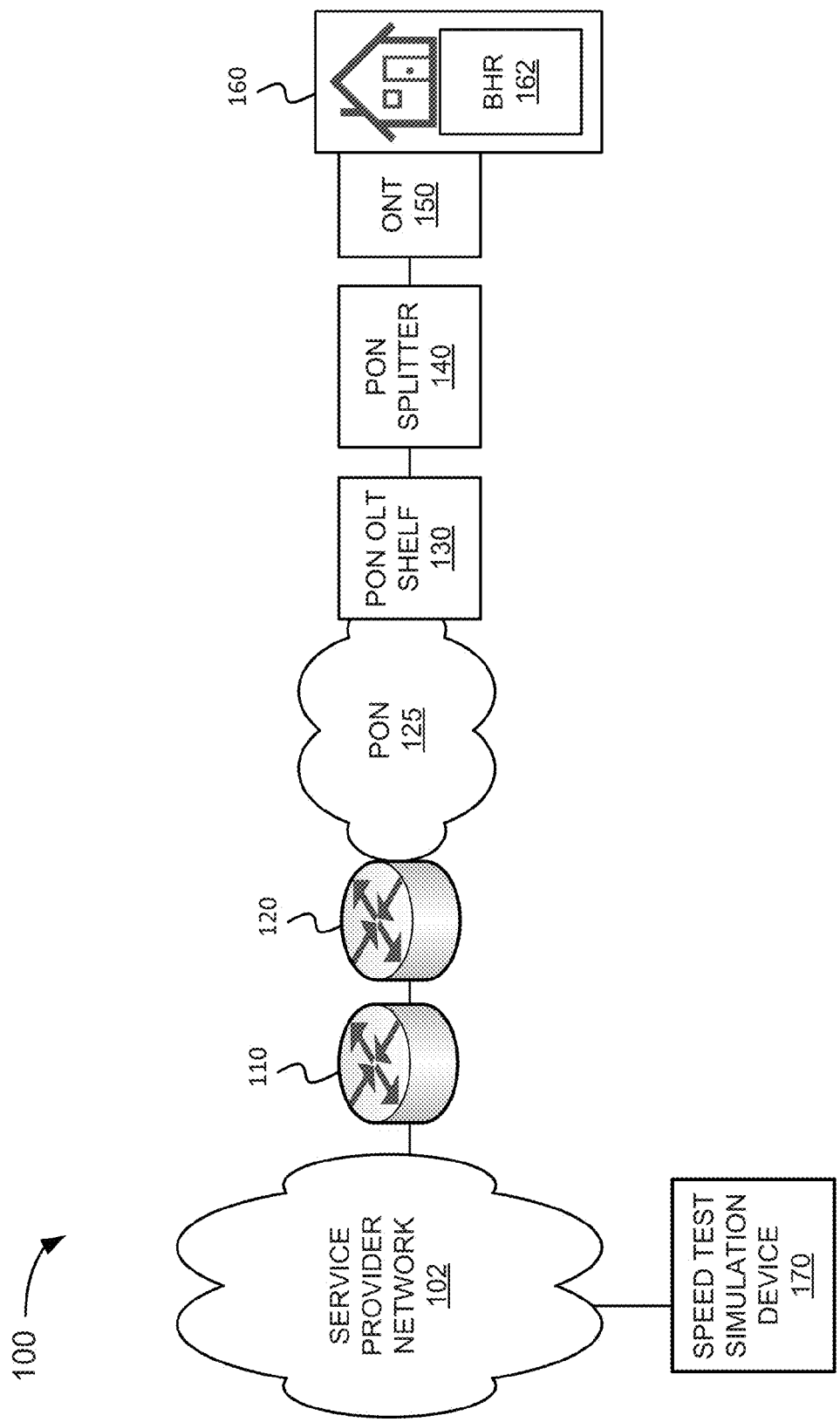
FIG. 1 illustrates an exemplary environment in which systems and methods described herein may be implemented.

FIG. 1 is a block diagram of an exemplary environment 100 in which systems and methods described herein may be implemented. Environment 100 may include a service provider network 102, a core router 110, a gateway router 120, a passive optical network (PON) 125, a PON optical line terminal (OLT) shelf 130 (also referred to herein as OLT 130), a PON splitter 140, an optical network terminal (ONT) 150, a customer's premises 160 and a speed test simulation device 170. The exemplary configuration illustrated in FIG. 1 is provided for simplicity. It should be understood that a typical environment may include more or fewer devices than illustrated in FIG. 1. For example, a single core router 110, gateway router 120, PON OLT shelf 130, PON splitter 140, ONT 150, subscriber home 160 and speed test simulation device 170 are shown for simplicity. It should be understood that environment 100 may include a large number (e.g., hundreds or thousands) of customers' premises 160 and a number of other network components. Environment 100 may also include additional elements, such as switches, backend systems, etc., that aid in providing services to customers' premises 160.

Network 102 may include one or more wired, wireless and/or optical networks that are capable of receiving and transmitting data, voice and/or video signals, including multimedia signals that may include voice, data and video information. Network 102 may include devices to collect, generate, and provide video and/or multimedia content to subscribers of a video service. Video content may include, for example, encoded video content in any of a variety of formats, including, for example, Multiview Video Coding (MVC), Moving Picture Experts Group (MPEG)-2 TS, MPEG-4 advanced video coding (AVC)/H.264, etc.

In an exemplary implementation, network 102 may represent a network associated with a service provider that provides various services, such as Internet-protocol (IP) related services, value added services, etc. For example, in one implementation, network 102 may represent an Internet Protocol Multimedia Subsystem (IMS) network that provides services to IMS subscribers (referred to herein as subscribers).

Core router 110 may include a high speed router in a packet switching network. For example, core router 110 may include a local access transport area (LATA) core router for Internet. Core router 110 may generally function to transmit data between other routers within environment 100. Core router 110 may support routing protocols used at the core of network 102.

Gateway router 120 may include a gateway from network 102 to customers' premises 160. A gateway is a node on a TCP/IP network that serves as an access point to another network, in this instance network 102.

PONs 125 may include a high-speed fiber optic network that connects gateway router 120 to OLTs in PON OLT shelf 130. For example, PON OLT shelf 130 may include a large number of OLTs (e.g., more than 100) which provide service to a large number of subscribers (e.g., thousands), etc. Egress from gateway router 120 may be expanded in some instances to meet customer demand (e.g., to 2, 4, or 10 gigabit Ethernet (GigE) based on customer requirements. It should be understood that the general term PON may be interpreted to include multiple variations including Broadband PON (BPON), Gigabit PON (GPON), 10 Gigabit Ethernet PON (10 GePON), etc.

PON OLT shelf 130 may include multiple OLTs 130 that each deliver voice, data and video services to multiple customers of a network (e.g., at ONTs 150). Each OLT 130 may act as a service provider endpoint of a PON in a service provider network, such as Verizon's FiOS™ network. For example, OLT 130 may interface with equipment in customer's premises 160, such as an ONT 150, a broadband home router (BHR) 162, and/or other devices (e.g., modems), etc.

PON splitter 140 may include one or more strands of optical fiber and splitters for the optical fiber. The optical fibers that make up each PON may be physically distributed to a number of subscribers. For example, a PON may implement a fiber to the premises (FTTP) network in which a number of subscribers are provided with network connectivity by a length of optical fiber that runs from PON OLT shelf 130 to the premises of the subscribers. For example, PON OLT shelf 130 may provide 2.4 Gigabit down and 1.2 Gigabit up shared bandwidth among 32 customers' premises 160.

Customer premises 160 may include BHR 162 and data consuming devices such as STBs, DVRs, personal computers (PCs), tablets, smart phones, etc. Other devices in the home network, such as user devices, may connect to BHR 162 via wireless or wired connections or via an interface device (e.g., WiFi, Bluetooth, etc.). Customer premises 160 may receive data services from network 102. The service may be provided at an advertised rate.

BHR 162 may act as a hub for communications entering the customer's premises 160. For example, service provider network 102 may communicate with one or more of the devices in customer's premises 160 via PON 125 to BHR 162. Similarly, BHR 162 may communicate with one or more devices at service provider 102 and OLT 130 via ONT 150 and PON 125.

In implementations described herein, speed test simulation device 170 may develop a statistical model of traffic demand by service. Speed test simulation device 170 may use link traffic measurements to predict the throughput that speed tests will achieve. Although shown in FIG. 1 as being connected to network 102, in some instances speed test simulation device 170 may be implemented by itself with information indicating data demand in network 102 and physically independent of network 102. In other instances, speed test simulation device 170 may be implemented within network 102 to provide real time feedback and short term projections that may be used to improve service in network 102 and/or provide automatic remediation in network 102.

Figure 2:
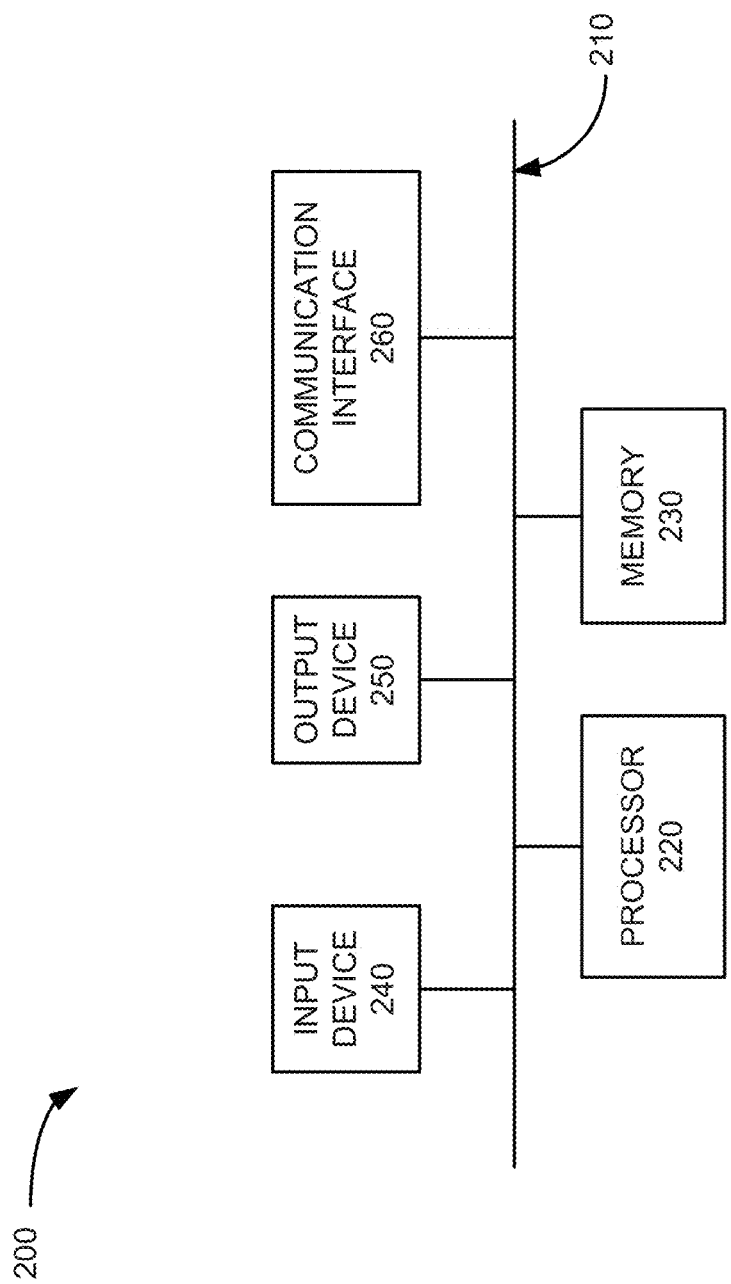
FIG. 2 illustrates exemplary components of one or more of the devices included in the environment of FIG. 1.

FIG. 2 is a diagram of exemplary components of a device 200 that may correspond to network 102, core router 110, gateway router 120, OLT 130, PON splitter 140, ONT 150, BHR 162 or speed test simulation device 170. Each of network 102, core router 110, gateway router 120, OLT 130, PON splitter 140, ONT 150, BHR 162 or speed test simulation device 170 may include one or more devices 200. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processor 220 executing machine-readable instructions contained in a computer-readable medium, such as memory 230. A computer-readable medium may include a non-transitory memory device. A memory device may include space within a single physical memory device or spread across multiple physical memory devices. The machine-readable instructions may be read into memory 230 from another computer-readable medium or from another device via communication interface 260. The machine-readable instructions contained in memory 230 may cause processor 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Figure 3:
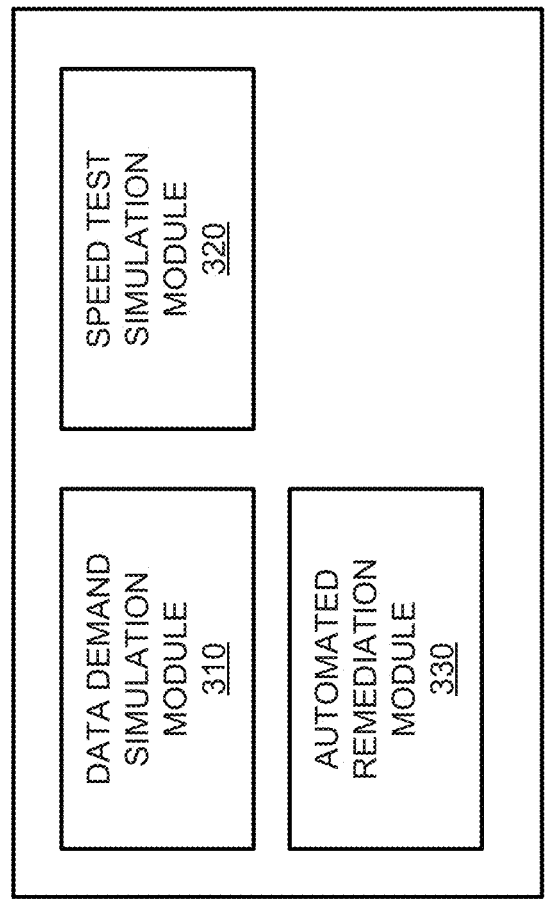
FIG. 3 is a diagram of exemplary functional components of the speed test simulation device of FIG. 1.

FIG. 3 is a diagram of exemplary functional components of speed test simulation device 170. As shown in FIG. 3, speed test simulation device 170 may include a data demand simulation module 310, a speed test simulation module 320, and an automated remediation module 330.

Data demand simulation module 310 may determine a data demand distribution that includes a statistical model of traffic (data demand) by service, such as described with respect to FIGS. 4 and 5 herein below. Data demand simulation module 310 may calculate a probability of exhaust of bandwidth based on a number of subscribers in each speed tier of data service (e.g., 1.5 Mbps, 5 Mbps, 40 Mbps, 100 Mbps, etc.). Data demand simulation module 310 may incorporate growth assumptions to model link usage over time.

Speed test simulation module 320 may determine a speed test throughput distribution, such as described herein below with respect to FIG. 6. Speed test simulation module 320 may determine the speed test throughput distribution based on a data demand distribution received from data demand simulation module 310. Speed test simulation module 320 may determine a speed test associated with a customer premises by adding to a baseline (data demand distribution) that corresponds to other customers that communicate data along the same link.

Automated remediation module 330 may determine real time and short term remediation based on the speed test throughput distribution, such as described herein below with respect to FIG. 7. For example, automated remediation module 330 may determine a maximum allowable link utilisation based on a quality of service (QoS) indication for how close to the provisioned speed the speed test should run.

Figure 4:
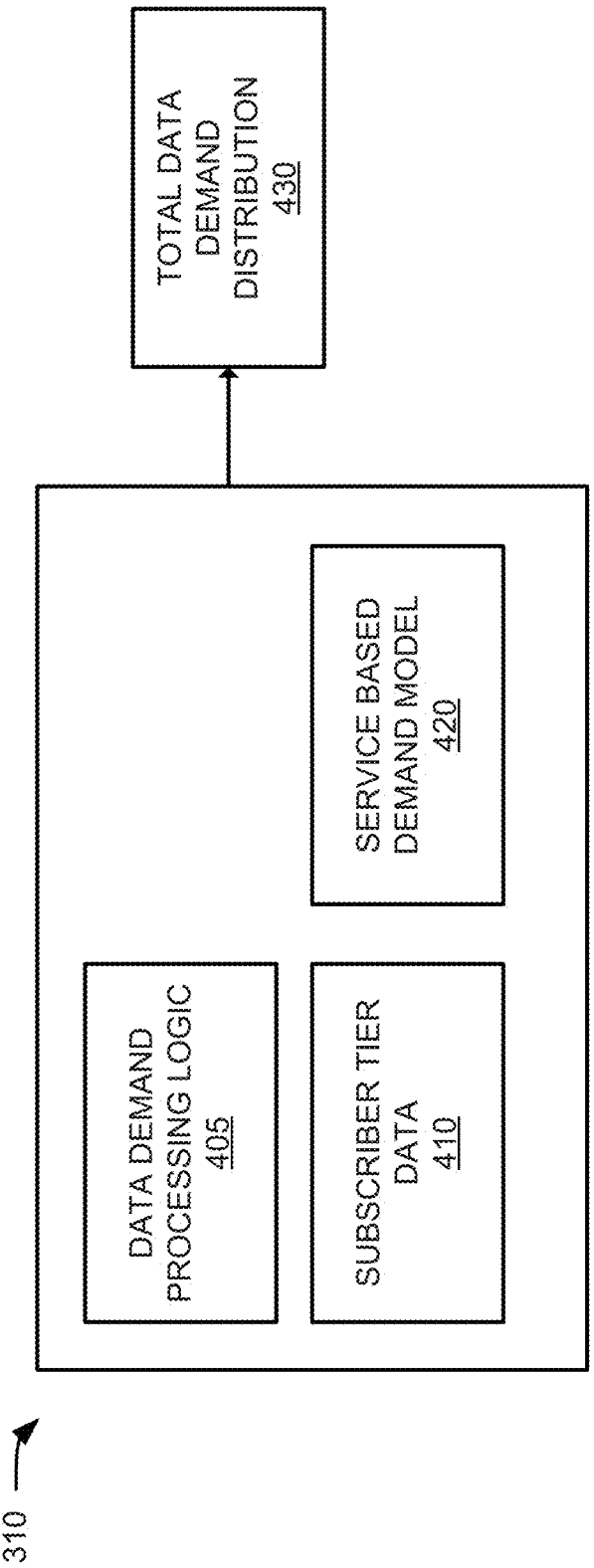
FIG. 4 is a diagram of exemplary functional components of the data demand simulation module of FIG. 3.

FIG. 4 is an exemplary functional block diagram of data demand simulation module 310 according to an exemplary implementation. As shown in FIG. 4, data demand simulation module 310 may include a data demand processing logic 405 that may access subscriber tier data 410 and service based demand models 420.

Data demand processing logic 405 may model the total traffic demand on the link (e.g., a gigabit Ethernet link) from GWR 120 to OLT 130. Data demand processing logic 405 may generate a total data demand distribution 430, which is a probability distribution that indicates a probability during a particular time (e.g., the busy evening hour) that demand is at a given level.

Data demand processing logic 405 may access subscriber tier data 410. Subscriber tier data 410 may identify a number of subscribers in each speed tier. For example, subscriber tier data 410 may identify a first number of subscribers in a first speed tier (e.g., 20 Mbps), a second number of subscribers in a second speed tier (e.g., 10 Mbps), etc.

Data demand processing logic 405 may determine a statistical model of traffic demand by service (i.e., a service based data demand model 420). The services may include services that have different data consumption characteristics, such as Internet Protocol television (IPTV), general Internet access, high speed data transmission lines (e.g., digital signal level 1s (DS1s)), live TV to consumer electronics devices, video on demand (VoD), etc. Data demand processing logic 405 may determine the service based data demand model 420 for each speed tier. In some instances, data demand processing logic 405 may determine the service based data demand model 420 based on real time or near real time data that applies to groups or subgroups of customers in a particular speed tier (e.g., regional data, etc.). The service based data demand model 420 may indicate a level of demand over time for a particular service and corresponding data consumption.

Data demand processing logic 405 may calculate a probability of exhaustion of a link bandwidth based on a number of subscribers in each speed tier. For example, data demand processing logic 405 may determine a random traffic distribution across the subscribers in each speed tier based on the service based data demand model 420 for each speed tier. Data demand processing logic 405 may then apply the projected demand to the link between GWR 120 and OLT 130 (e.g., PON 125). Data demand processing logic 405 may incorporate growth assumptions on a per service basis to model the link usage over time.

Data demand processing logic 405 may determine a service based demand model 420 that includes a burst data model that predicts the effect of short, high rate bursts on the link between GWR 120 and OLT 130. Data demand processing logic 405 may assume that bandwidth usage jumps to tier speed for a portion of a smallest identified consumption time in proportion to a portion of a provisioned speed consumed by the subscriber during the smallest identified consumption time. For example, if the provisioned speed is 5 Mbps and the subscriber consumes 50 Mbps during a smallest identified consumption time of a minute, data demand processing logic 405 may assume that the bandwidth usage is at tier speed for ten seconds of the minute. Data demand processing logic 405 may assume that each subscriber is either "on" (i.e., downloading at the tier rate) or "off" (not downloading). The corresponding probability of a subscriber being "on" in this instance is 16.66% (i.e., 1 in 6 or ten seconds of each minute). The "on" probability for subscribers in a speed tier remains constant during an identified time interval (e.g., busy hour demand). Data demand processing logic 405 may identify a number of data subscribers in each tier as an input to the burst data model. Data demand processing logic 405 may turn the subscribers "on" and "off" independently, resulting in a distribution of those that are "on" at a given time. Data demand processing logic 405 may implement the burst data model to find the probability distribution of total data demand from all subscribers at one observation time in the busy hour.

Data demand processing logic 405 may determine a service based demand model 420 that includes a VoD (video on demand) model that predicts the effect of VoD on the link between GWR 120 and OLT 130. Data demand processing logic 405 may identify (based on subscriber tier data 410) that each subscriber has a predetermined number of STBs (e.g., 3 STBs per subscriber). Data demand processing logic 405 may identify or estimate a watching percentage of STBs that are receiving VoD content (i.e., consuming data) during the identified time interval (e.g., 1.3%). Data demand processing logic 405 may also identify percentages of the STBs that receive VoD content at a first data consumption rate (e.g., 40% standard definition (SD) at 3.75 Mbps) and a second data consumption rate (e.g., 60% high definition (HD) at 15 Mbps). Data demand processing logic 405 may identify a number of VoD subscribers in each tier as an input to the VoD model. Data demand processing logic 405 may implement the VoD model to identify a distribution of the number of STBs watching VoD around the identified watching percentage (e.g., around 1.3%). Data demand processing logic 405 may implement the VoD model to identify the distribution of VoD bandwidth demand.

Data demand processing logic 405 may also add the distribution of data demand from each service based demand model 420 to determine a probability density of total demand at a particular time. For example, data demand processing logic 405 may add the distribution of VoD bandwidth demand and the probability distribution of total data demand based on the burst data model to determine a total data demand distribution 430 as shown in FIG. 5.

Figure 5:
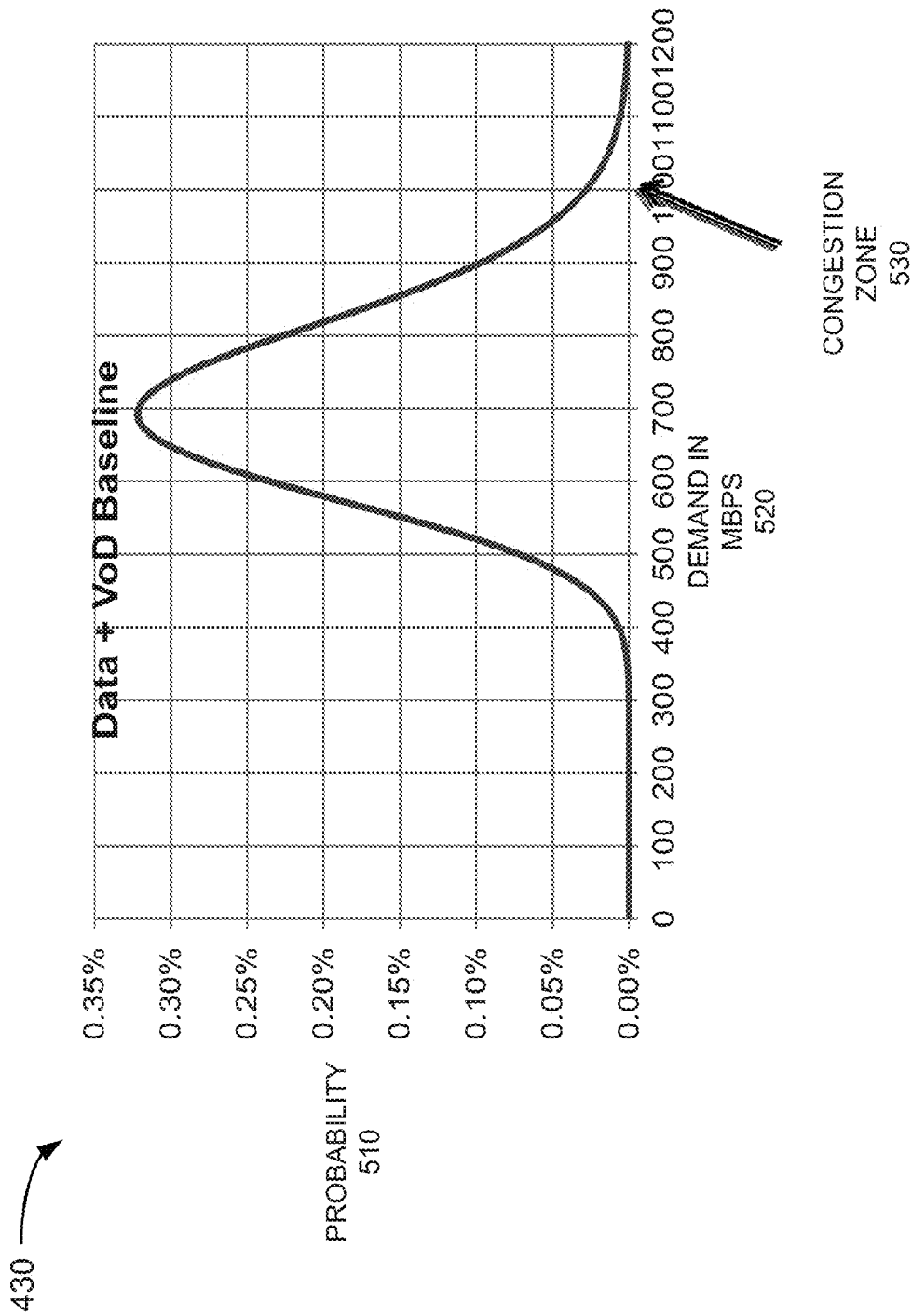
FIG. 5 is an exemplary graph of a data demand distribution according to an implementation described herein.

FIG. 5 shows a snapshot of probability density (probability 510 in FIG. 5) of total demand (demand in Mbps 520) at one time, obtained by adding up data demand and VoD demand. In this example, the demand averages about 700 Mbps. In instances in which demand goes above 1000 Mbps, the link between GWR 120 and OLT 130 (i.e., a gigabit Ethernet (GigE) link) may become congested (congestion zone 530) and data traffic will suffer.

Figure 6:
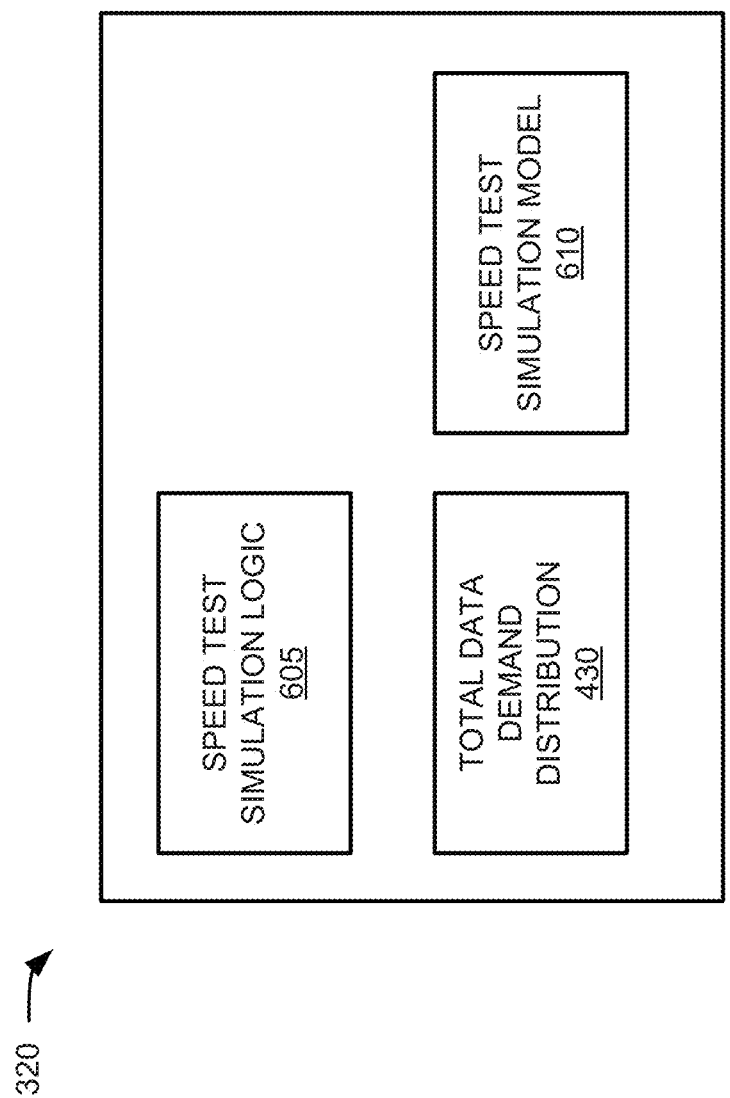
FIG. 6 is a diagram of exemplary functional components of the speed test simulation module of FIG. 3.

FIGS. 6 is an exemplary functional block diagram of speed test simulation module 320. As shown in FIG. 6, speed test simulation module 320 may include a speed test simulation logic 605 that may access total data demand distribution 430 and a speed test simulation model 610.

As shown in FIG. 6, speed test simulation logic 605 may access total data demand distribution 430, for example by receiving total data demand distribution 430 from speed test simulation logic 605. Total data demand distribution 430 may include a probability distribution of the total steady-state download rate R in the busy hour. Speed test simulation logic

605 may identify the download rate R at a fixed instant within the identified time interval (e.g., busy hour). Total data demand distribution 430 gives the probability P based on:

$$F(x)=P(R\leq x) \quad \text{(Eqn 1)}$$

where R is at most x for any given value x. The graph of total data demand distribution 430 as shown in FIG. 5 represents the probability density f(x) given by:

$$f(x)=F'(x)=P(x\leq R\leq x+dx) \quad \text{(Eqn 2)}$$

or the probability P that R lies in an infinitesimal interval around x, identified as dx in Eqn. 2.

Speed test simulation logic 605 may implement speed test simulation model 610 to determine a throughput associated with a speed test client based on total data demand distribution 430 and a speed tier for the particular subscriber, in this instance identified as r. Speed test simulation logic 605 may simulate a speed test performed by the speed test client. The speed test client (e.g., a speed test client that speed test simulation logic 605 is implemented to simulate) transfers a file and measures how many bits per second is transferred to the subscriber (i.e., actual time to transmit the file divided by the time to transmit the file). Speed test simulation logic 605 may predict speed test outcomes for all speed tiers.

Speed test simulation logic 605 may also implement speed test model 610 to determine a speed test throughput distribution. The speed test throughput distribution may identify a probable distribution of throughputs that a speed test client for a subscriber in a particular speed tier r will determine if it runs a speed test at a particular time.

Speed test simulation logic 605 may assume that the speed test client sees the distribution R as background traffic while the speed test client runs the speed test. The total offered download traffic rate during the speed test is R+r. Speed test simulation logic 605 may identify a deterministic function f(r, x) such that the throughput speed S is given by $$S=f(r,R) \quad \text{(Eqn 3)}.$$

The throughput function f may be generated by an appropriate program, such as QuickPredict™ from OPNET.

Speed test simulation logic 605 may determine that:

$$S=r \text{ if } R+r<c, \quad \text{(Eqn 4)}$$

where c is the link capacity.

Speed test simulation logic 605 may also determine that f(r, x) decreases monotonically when x>c for fixed r. Since S is a function of the rate R, speed test simulation logic 605 may immediately determine the distribution of S from the distribution of R. Speed test simulation logic 605 may also determine an average of the distribution of R to get the mean of S, ES, using equation 5 below:

$$ES=Ef(r,R). \quad \text{(Eqn 5)}$$

According to one implementation, speed test simulation logic 605 may determine a simplified model in which R takes only integer values ranging from 0 to a highest integer y. For example, R may be 0, 1, 2, . . . , 1000 so that the distribution of R is given by probabilities $p_i=P(R=i)$, where i is equal to any integer. Speed test simulation logic 605 may determine a mean throughput ES:

$$ES = \sum_{i=0}^{1000} f(r,i)p_i. \quad \text{(Eqn 6)}$$

Figure 7:
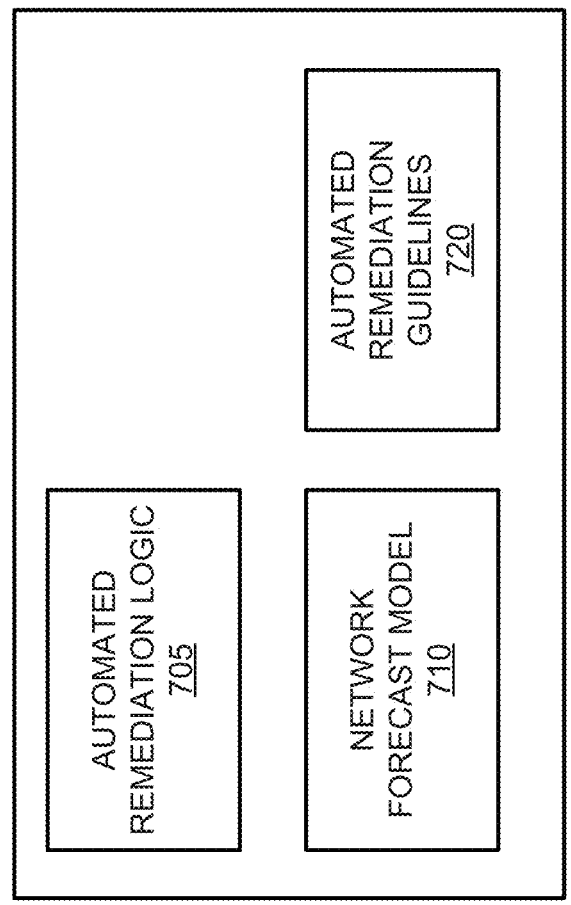
FIG. 7 is a diagram of exemplary functional components of the automated remediation module of FIG. 3.

FIG. 7 is an exemplary functional block diagram of automated remediation module 330. As shown in FIG. 7, automated remediation module 330 may include automated remediation logic 705 that may access a network forecast model 710 and automated remediation guidelines 720.

Automated remediation logic 705 may monitor utilization on all links between GWR 120 and OLT 130. Automated remediation logic 705 may identify usage patterns and incorporate network forecast model 710 (i.e., one or more growth models) to determine when data demand on links that are projected to exceed a maximum data capacity. Automated remediation logic 705 may define the data demand as exceeding the maximum data capacity when the probability of exceeding the maximum demand during a busy period exceeds a predetermined probability. Automated remediation logic 705 may alert personnel associated with a service provider for network 102 when total data demand distribution 430 is within a predetermined probability of exceeding the maximum link capacity. In other words, automated remediation logic 705 may ensure that total data demand distribution 430 does not exceed a threshold probability of exceeding maximum link capacity.

Automated remediation logic 705 may provide options based on automated remediation guidelines 720 that may be applied when the data demand is projected to exceed the maximum data capacity. Automated remediation logic 705 may apply an automated remediation measure to reduce the ratio of the total data demand distribution to the maximum link capacity (by reducing the total data demand distribution (e.g., projected growth of) and/or increasing the maximum link capacity). For example, automated remediation logic 705 may flag links for relief when their utilizations approach the maximum data capacity. In that way, personnel associated with the service provider may be alerted to add capacity to satisfy a quality of service (QoS) target. In other implementations, a service provider associated with environment 100 may automatically add capacity and/or re-route traffic when utilization is approaching a maximum data capacity (i.e., the threshold probability of exceeding maximum link capacity). In another implementation, automated remediation logic 705 may identify intermediate speed tier packages to offer to customers (e.g., new customers) when the data demand approaches the maximum data capacity, and/or offer intermediate speed tier packages on a temporary basis for customers (e.g., existing customers or a predetermined number of new customers).

Figure 8:
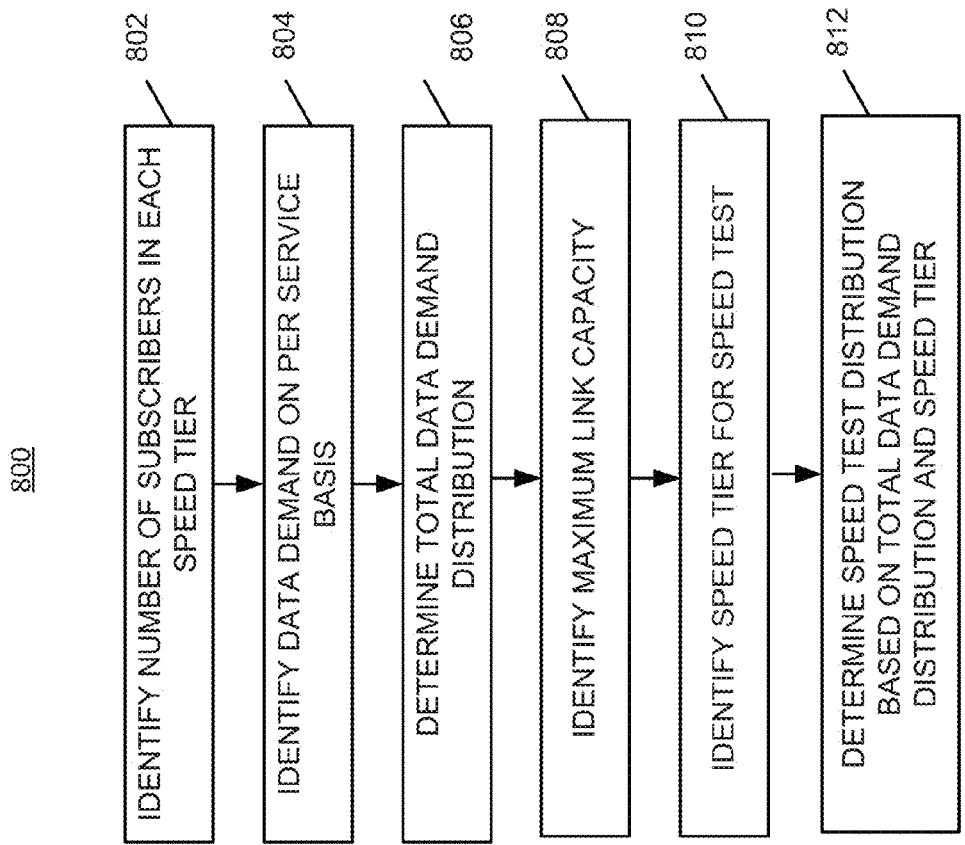
FIG. 8 is a flowchart of an exemplary process for determining a speed test throughput distribution according to an implementation described herein.

FIG. 8 is a flow chart of an exemplary process for implementing speed test simulation according to implementations described herein. In one implementation, process 800 may be performed by speed test simulation device 170. In another implementation, some or all of process 800 may be performed by another device or group of devices, including or excluding speed test simulation device 170.

At block 802, speed test simulation device 170 may identify a number of subscribers in each speed tier associated with a link between GWR 120 and OLT 130. Speed test simulation device 170 may access or receive subscriber tier data 410, such as described with respect to FIG. 4 above. Subscriber tier data 410 may include information indicating a number of subscribers in each speed tier.

At block 804, speed test simulation device 170 may determine data demand on a per service basis. For example, speed test simulation device 170 may determine the data demand based on a statistical model for each subscriber tier on a per service basis for a particular link, such as described above with respect to FIG. 4. Speed test simulation device 170 may determine the data demand distribution for VoD, Internet access, live TV to consumer electronics devices, IPTV, high speed data transmission lines, etc. For example, speed test simulation device 170 may determine data demand distribution for each service using a corresponding model, such as a burst data model (high rate data services) or a VoD model (VoD services) as described with respect to FIG. 4 herein above.

At block 806, speed test simulation device 170 may determine a total data demand distribution 430. For example, speed test simulation device 170 may add data demand distributions for all services that are received via the link between GWR 120 and OLT 130. For example, speed test simulation device 170 may add the distributions determined by the burst data model and the VoD model.

Speed test simulation device 170 may identify a maximum link capacity of the link between GWR 120 and OLT 130 (block 808). For example, speed test simulation device 170 may identify the link between GWR 120 and OLT 130 as a GigE link.

At block 810, speed test simulation device 170 may identify a speed tier for a speed test. Speed test simulation device 170 may identify and execute a speed test representing each speed tier.

Speed test simulation device 170 may determine a speed test throughput distribution based on total data demand distribution 430 and the speed tier (block 812). For example, speed test simulation device 170 may apply a deterministic function (e.g., Eqn 3, above) to the sum of total data demand distribution 430 and the speed tier. The mean throughput may be determined as described with respect to equation 5 and FIG. 6 above.

Systems and methods described herein may use a download rate distribution and a throughput function f to determine the speed test throughput distribution. The systems and methods may be implemented based on different traffic demand models. A speed test throughput distribution may be determined based on the total data demand probability. In addition, the systems and methods may relate ambient traffic conditions during a speed test to throughput observed by the speed test device.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions--it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method comprising:
   determining a total data demand distribution for a plurality of subscribers associated with a link between a gateway router (GWR) and an optical line terminal (OLT) in a network;
   identifying a maximum link capacity of the link between the GWR and the OLT;
   identifying a speed tier for which a speed test is to be executed;
   determining, by a computing device, a speed test throughput distribution based on the speed tier, the total data demand distribution and the maximum link capacity in an identified time interval;
   identifying when the total data demand distribution is projected to exceed the maximum link capacity; and
   applying an automated remediation measure to reduce the ratio of the total data demand distribution to the maximum link capacity.

2. The computer-implemented method of claim 1, wherein determining the total data demand distribution further comprises:
   identifying at least one speed tier for each of at least one subset of the plurality of subscribers;
   identifying a number of subscribers in each subset of the plurality of subscribers for each of the at least one speed tier;
   identifying data demand on a per service basis for each of the at least one speed tier for each subset of the plurality of subscribers; and
   determining the total data demand distribution based on aggregating the data demand for the plurality of subscribers at a specific instant in an identified time interval.

3. The computer-implemented method of claim 2, wherein the at least one subset of the plurality of subscribers is a set of data subscribers and identifying data demand further comprises:
   identifying each of the data subscribers as "on" or "off", based on whether a data subscriber is downloading at a rate of the speed tier; and
   determining a distribution of data demand for the set of data subscribers at the specific instant in the identified time interval.

4. The computer-implemented method of claim 2, wherein the at least one subset of the plurality of subscribers is a set of video on demand (VoD) subscribers and identifying data demand further comprises:
   identifying a predetermined number of VoD consuming devices associated with each VoD subscriber;
   estimating a percentage of the VoD consuming devices that receive VoD in the identified time interval;
   estimating a percentage of the predetermined number of VoD consuming devices that receive VoD at a particular data consumption rate; and
   determining a distribution of data demand for the set of VoD subscribers based on the identified percentage of the VoD consuming devices at the specific instant in the identified time interval.

5. The computer-implemented method of claim 2, further comprising:
identifying a congestion point based on the total data demand distribution and the maximum link capacity.

6. The computer-implemented method of claim 2, wherein identifying data demand on a per service basis further comprises:
identifying the data demand based on a high speed service, an Internet protocol television (IPTV) service, Internet access service, a high speed data transmission line service, a live TV to consumer electronics device service, and a video on demand (VoD) service.

7. The computer-implemented method of claim 1, wherein the identified time interval is a busiest hour for data transfer in the network.

8. The computer-implemented method of claim 1, wherein determining a total data demand distribution for a plurality of subscribers further comprises:
incorporating at least one growth assumption over time when determining the total data demand distribution.

9. The computer-implemented method of claim 1, wherein the total data demand distribution identifies a download rate R in the identified time interval and the probability (P) that R lies in an interval dx around x, for any given value x, and is given by:

$$f(x)=P(x\leq R\leq x+dx).$$

10. The computer-implemented method of claim 9, wherein determining the speed test throughput distribution further comprises applying:
S=r if R+r<c, wherein r is a speed tier, S is a throughput speed for a speed test and c is the maximum link capacity.

11. The computer-implemented method of claim 10, wherein:
f(r, x) decreases monotonically when x>c for fixed r.

12. The computer-implemented method of claim 11, further comprising:
determining a mean data throughput ES by applying:

$$ES = \sum_{i=0}^{c} f(r, i)p_i,$$

wherein distribution of R is given by probabilities $p_i$=P(R=i).

13. The computer-implemented method of claim 1, wherein applying the automated remediation measure further comprises:
alerting personnel associated with a service provider for the network that the total data demand distribution is within a predetermined probability of exceeding the maximum link capacity.

14. A device, comprising:
a memory to store a plurality of instructions; and
a processor configured to execute the instructions in the memory to:
determine a total data demand distribution for a plurality of subscribers associated with a link between a gateway router (GWR) and an optical line terminal (OLT) in a network; wherein, when determining the total data demand distribution, the processor is further configured to:
identify at least one speed tier for each of at least one subset of the plurality of subscribers, wherein the at least one subset of the plurality of subscribers is a set of video on demand (VoD) subscribers:
identify a number of subscribers in each subset of the plurality of subscribers for each at least one speed tier, wherein when identifying the data demand, the processor is further configured to
identify a predetermined number of VoD consuming devices associated with each VoD subscriber,
estimate a percentage of the VoD consuming devices that receive VoD in the identified time interval,
estimate a percentage of the predetermined number of VoD consuming devices that receive VoD at a particular data consumption rate, and
determine a distribution of data demand for the set of VoD subscribers based on the identified percentage of the VoD consuming devices at the specific instant in the identified time interval;
estimate data demand on a per service basis for each of the at least one speed tier for each subset of the plurality of subscribers;
determine the total data demand distribution based on aggregating the data demand for the plurality of subscribers at a specific instant in an identified time interval;
identify a maximum link capacity of the link between the GWR and the OLT;
identify a speed tier at which a speed test is to be executed; and
determine a speed test throughput distribution based on the speed tier, the total data demand distribution and the maximum link capacity in an identified time interval.

15. The device of claim 14, wherein the at least one subset of the plurality of subscribers is a set of data subscribers and when identifying the data demand the processor is further to:
identify each of the data subscribers as "on" or "off", wherein a data subscriber downloading at a rate of the speed tier is "on" and a data subscriber not downloading is "off"; and
determine a distribution of data demand for the set of data subscribers at the specific instant in the identified time interval.

16. The device of claim 14, wherein the total data demand distribution identifies a download rate R in the identified time interval and the probability (P) that R lies in an interval dx around x, for any given value x, is given by:

$$f(x)=P(x\leq R\leq x+dx).$$

17. A non-transitory computer-readable medium including instructions to be executed by a processor, the instructions including one or more instructions, when executed by the processor, for causing the processor to:
determine a total data demand distribution for a plurality of subscribers associated with a link between a gateway router (GWR) and an optical line terminal (OLT) in a network;
identify a maximum link capacity of the link between the GWR and the OLT;
identify a speed tier at which a speed test is to be executed; and
determine a speed test throughput distribution based on the speed tier, the total data demand distribution and the maximum link capacity in an identified time interval;
identify when the total data demand distribution is projected to exceed the maximum link capacity; and apply an automated remediation measure to reduce the ratio of the total data demand distribution to the maximum link capacity.

18. The non-transitory computer-readable medium of claim 17, wherein, when determining the total data demand distribution, the one or more instructions further includes instructions to:

identify at least one speed tier for each of at least one subset of the plurality of subscribers;

identify a number of subscribers in each subset of the plurality of subscribers for each of the at least one speed tier;

identify data demand on a per service basis for each of the at least one speed tier for each subset of the plurality of subscribers; and determine the total data demand distribution based on aggregating the data demand for the plurality of subscribers at a specific instant in an identified time interval.

19. The non-transitory computer-readable medium of claim 17, wherein the identified time interval is a busiest hour for data transfer in the network.

20. The non-transitory computer-readable medium of claim 17, wherein the one or more instructions further includes instructions to:

determine a mean data throughput ES by applying:

$$ES = \sum_{i=0}^{c} f(r, i) p_i,$$

wherein distribution of R is given by probabilities $p_i = P(R=i)$.

* * * * *